United States Patent
Schorn et al.

(10) Patent No.: US 9,940,068 B2
(45) Date of Patent: Apr. 10, 2018

(54) DEVICE AND METHOD FOR DETERMINING MEMORY LEAKS

(71) Applicant: Wind River Systems, Inc., Alameda, CA (US)

(72) Inventors: Markus Schorn, Alameda, CA (US); David M. Lerner, Alameda, CA (US)

(73) Assignee: WIND RIVER SYSTEMS, INC., Alameda, CA (US)

( * ) Notice: Subject to any disclaimer, the term of this patent is extended or adjusted under 35 U.S.C. 154(b) by 122 days.

(21) Appl. No.: 14/966,270

(22) Filed: Dec. 11, 2015

(65) Prior Publication Data

US 2017/0168753 A1    Jun. 15, 2017

(51) Int. Cl.
G06F 3/06 (2006.01)

(52) U.S. Cl.
CPC .......... G06F 3/0653 (2013.01); G06F 3/0617 (2013.01); G06F 3/0673 (2013.01)

(58) Field of Classification Search
CPC .... G06F 3/0617; G06F 3/0653; G06F 3/0673; G06F 11/079; G06F 12/0253; G06F 2009/45583
See application file for complete search history.

(56) References Cited

U.S. PATENT DOCUMENTS

| | | | | |
|---|---|---|---|---|
| 7,200,731 B2 * | 4/2007 | Raut | ...................... | G06F 12/023 711/170 |
| 9,064,048 B2 * | 6/2015 | Macik | .................. | G06F 11/3612 |
| 2008/0294936 A1 * | 11/2008 | Hogstrom | .............. | G06F 11/366 714/6.13 |
| 2010/0211754 A1 * | 8/2010 | Crosby | .................. | G06F 9/5016 711/170 |
| 2012/0075175 A1 * | 3/2012 | Kirkup | ................. | G06F 11/3024 345/156 |
| 2013/0174127 A1 * | 7/2013 | Chen | .................... | G06F 11/3466 717/133 |
| 2014/0282431 A1 * | 9/2014 | Delio, Jr. | ............. | G06F 11/3466 717/130 |
| 2016/0070633 A1 * | 3/2016 | Abraham | ............. | G06F 11/3612 714/47.3 |

OTHER PUBLICATIONS

Roy, "*Mpatrol: A library for controlling and tracing dynamic memory allocation*", Edition 2.17 for mpatrol version 1.5.1, 19th Dec. 2008, 258 pps.

(Continued)

*Primary Examiner* — Hashem Farrokh

(57) ABSTRACT

A device and method generates a graphical representation for memory leak detection. The method includes executing a selected application for a time period. The method includes determining a plurality of memory application programming interface (API) functions performed during the execution of the selected application in the time period. Each of the memory API functions request a chunk of a memory of the electronic device at a specified time. The method includes determining select ones of the memory API functions that do not release the respective chunk of the memory in the time period. The method includes generating the graphical representation including the selected memory API functions at the respective specified time for identification of a memory leak of the selected application.

16 Claims, 4 Drawing Sheets

(56) References Cited

OTHER PUBLICATIONS

Ghemawat, "*Gperftools CPU Profiler*", https://gperftools.googlecode.com/svn/trunk/doc/cpuprofile.html Google, 4th Nov. 2012, 8 pps.

Demetriou' "*Google CPU Profiler Binary Data File Format*", https://gperftools.googlecode.com/svn/trunk/doc/cpuprofilefileformat.html, Google, 29th Nov. 2007, 3pps.

Seward et al, "*Valgrind Documentation*", Release 3.10.0, 10th Sep. 2014, 349 pps.

"*Rational PurifyPlus for Linux Reference Manual*", support@rational.com, http://www.rational.com Version:2003.06.00 Unix, 2003, 69 pps.

\* cited by examiner

DEVICE AND METHOD FOR DETERMINING MEMORY LEAKS

BACKGROUND INFORMATION

An electronic device may include a processor that executes a variety of different programs or applications to automatically perform various functionalities. The electronic device may further include storage components such as a disk drive that enables data to be stored in a general manner and a Random Access Memory (RAM) that enables the applications to request an allocation of the RAM for temporary use while the application is being executed. For example, when the application requires to temporarily store some data during execution, the application may dynamically request the allocation of a chunk from the RAM. The request for this allocation may be included as a call to a function which is itself defined by one or more lines within the code of the application. Furthermore, during the course of the application being executed, there may be a plurality of calls to this or similar memory application programming interface functions from the application that request the allocation of RAM. In addition, further applications may be executed concurrently that may also request the allocation of RAM.

Because the RAM is a limited resource, the code of the application may further include code that releases the allocated RAM when there is no further need for the temporary requirement of the allocation. The application requesting the allocation of RAM is therefore responsible for freeing or releasing the allocated RAM upon completion of its use so that the RAM does not run out or remain pending in a low-resource state which may result in adverse effects for the electronic device and the applications being executed (e.g., application crash, system crash, slow processing, etc.). When the allocated RAM is not ultimately released, this is defined as a memory leak where the allocated chunk is not being used by the application but where the device or other applications do not have access to this allocated chunk.

The longer the application with the memory leak continues to run, the more likely that memory leaks will accumulate in this time period that eventually causes the RAM to run out. One possible response is to reboot the electronic device that effectively frees all allocated RAM. However, upon another execution of the application with the memory leak, the memory leaks may again accumulate. Thus, a more permanent response is to review the lines of code of the application to determine the cause for the memory leak. Conventionally, this process is performed manually where the user simply goes line by line in the code. However, those skilled in the art will understand that the code of the application may include thousands or millions of lines of code.

SUMMARY OF THE INVENTION

The exemplary embodiments describe a method for determining memory leaks. The method comprises executing a selected application for a time period; determining a plurality of memory application programming interface (API) functions performed during the execution of the selected application in the time period, each of the memory API functions requesting a chunk of a memory of the electronic device at a specified time; determining select ones of the memory API functions that do not release the respective chunk of the memory in the time period; and generating a graphical representation including the selected memory API functions at the respective specified time for identification of a memory leak of the selected application.

The exemplary embodiments describe a device for determining memory leaks. The device comprises a storage arrangement including a memory in which portions thereof is allocated for use by at least one application; and a processor configured to identify a memory leak, the processor configured to execute a selected application for a time period, the processor configured to determine a plurality of memory application programming interface (API) functions performed during the execution of the selected application in the time period, each of the memory API functions requesting a chunk of the memory at a specified time, the processor configured to determine select ones of the memory API functions that do not release the respective chunk of the memory in the time period, the processor configured to generate a graphical representation including the selected memory API functions at the respective specified time for identification of a memory leak of the selected application.

The exemplary embodiments describe a non-transitory computer readable storage medium with an executable program stored thereon, wherein the program instructs a microprocessor to perform operations to determine memory leaks. The instructions comprise executing a selected application for a time period; determining a plurality of memory application programming interface (API) functions performed during the execution of the selected application in the time period, each of the memory API functions requesting a chunk of a memory of an electronic device at a specified time; determining select ones of the memory API functions that do not release the respective chunk of the memory in the time period; and generating a graphical representation including the selected memory API functions at the respective specified time for identification of a memory leak of the selected application.

DETAILED DESCRIPTION

Figure 1:
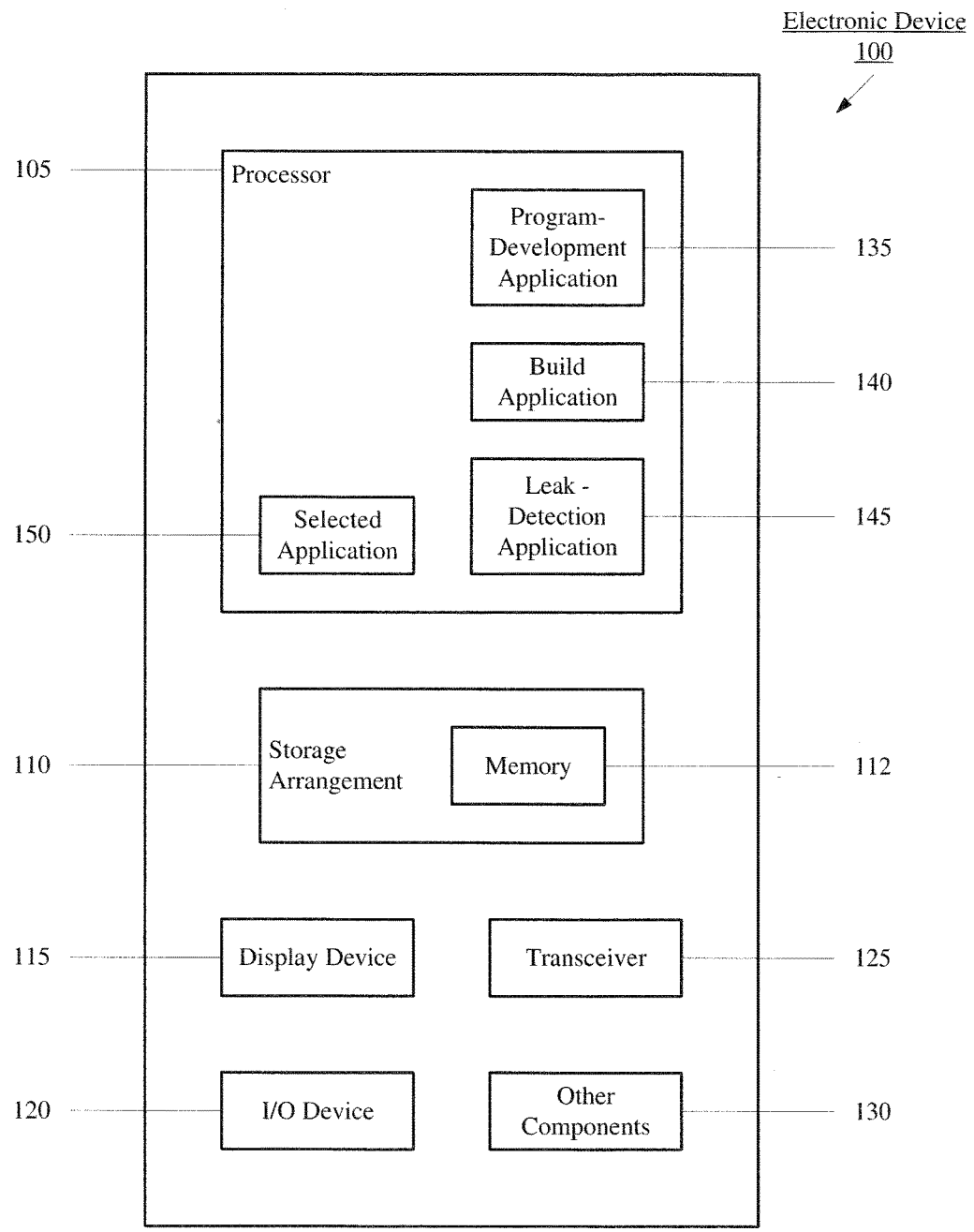
FIG. 1 shows an electronic device according to the exemplary embodiments.

The exemplary embodiments may be further understood with reference to the following description of the exemplary embodiments and the related appended drawings, wherein like elements are provided with the same reference numerals. The exemplary embodiments are related to a device and method for graphically representing memory allocations during a time period in which an application is executed. Specifically, the graphical representation illustrates unfreed allocations during the time period as a function of time. Accordingly, a user may view the graphical representation and determine whether the application includes a memory leak.

FIG. 1 shows components of an exemplary electronic device 100 configured to execute an application and determine whether the application includes a memory leak. The electronic device 100 may represent any electronic device such as a portable device (e.g., a cellular phone, a smartphone, a tablet, a phablet, a laptop, a wearable, etc.) or a stationary device (e.g., desktop computer). The electronic device 100 may include a processor 105, a storage arrangement 110 that includes a memory 112, a display device 115, an input/output (I/O) device 120, a transceiver 125, and other components 130 such as the portable power supply, an audio I/O device, a data acquisition device, ports to electrically connect the electronic device 100 to other electronic devices, etc.

The processor 105 may be configured to execute a plurality of applications of the electronic device 100. For example, the applications may include a web browser that enables the user to retrieve information while connected to a network via the transceiver 125. In another example, the applications may include transmitting short messaging service (SMS) messages, exchanging email, performing voice and/or video communications, etc. In further examples, the applications may include a program-development application 135, a build application 140, and a leak-detection application 145. As will be described in further detail below, the program-development application 135 may enable a user to view the lines of code for a selected application 150, the build application 140 may compile the code to execute the selected application 150, and the leak-detection application 145 may be configured to determine when the memory acquiring and releasing functions are called to be performed during a time period while the selected application 150 is being executed. As will be used herein, these memory acquiring and releasing functions will collectively be referred to as "memory application programming interface (API) functions."

It should be noted that the applications executed by the processor 105 are only exemplary. In a first example, the processor 105 may be an applications processor. In another example, the functionality described for the applications may also be represented as a separate incorporated component of the electronic device 100 (e.g., an integrated circuit with or without firmware) or may be a modular component coupled to the electronic device 100. The functionality may also be distributed throughout multiple components of the electronic device 100.

It should also be noted that functionalities described herein for the program-development application 135, the build application 140, and the leak-detection application 145 being performed by the processor 105 are only exemplary. According to another exemplary embodiment, the functionalities performed by the program-development application 135 and the build application 140 may be performed by a different electronic device. The functionalities performed by the leak-detection application 145 may also be performed at least partially by a different electronic device. Accordingly, the leak-detection application 145 of the electronic device 100 may receive all resulting information from performing the functionalities to provide the features of the exemplary embodiments.

For example, it is typical that applications that are loaded on and executed by the electronic device 100 are written by programmers executing an integrated development environment (IDE) or software development kit (SDK). Typically, the programmers will write the general application in the IDE and then make specific alterations for the type of platform (e.g., operating system, device, etc.) of the electronic device 100 and compile the application. The programmers will then port the compiled application to the electronic device 100 to test the application on the specific electronic device 100. In other situations, the programmers will port the compiled application to an emulation of the electronic device 100 to test the application. Thus, when the functionalities of the program-development application 135, the build application 140, and the leak-detection application 145 are described in greater detail below, it should be understood that these applications 135-145 may not be executed by the electronic device 100.

The storage arrangement 110 may be a hardware component configured to store data related to operations performed by the electronic device 100. The storage arrangement 110 may include one or more storage components configured to store the data. In a first example, the storage arrangement 110 may include a general data storage component such as a disk drive. In a second example, the storage arrangement 110 may include a processing storage component (hereinafter referred as "memory" 112) such as a Random Access Memory (RAM). Those skilled in the art will understand that the disk drive may provide a large storage capacity for data to be written thereon and remain stored thereon even when power is cut to this component. For example, the disk drive may utilize magnetic features to store this data on disks. However, use of the disk drive is relatively slow as data thereon needs to be located, read, and transmitted to the appropriate component before this data can be processed. In contrast, the memory 112 provides a series of chips that loads data from the various applications such as the selected application 150 (including any operating system) which may be retrieved near instantaneously. However, any loss in power results in data stored in the memory 112 to be lost. Furthermore, the memory 112 has a lesser storage capacity. Thus, chunks of the memory 112 that is allocated to an application is on a temporary basis.

The display device 115 may be a hardware component configured to show data to a user while I/O device 120 may be a hardware component configured to receive inputs from the user and output corresponding data. As will be described in further detail below, the display device 115 may show a graphical representation generated by the leak-detection application 145 as well as provide an interface in which the code of the selected application 150 is shown via the program-development application 135 so that inputs received via the I/O device 120 may be entered to make a change in the code to fix a memory leak. The transceiver 125 may enable the connection between the electronic device 100 and another electronic device. Specifically, when the functionalities of the program-development application and/or the build application 140 are performed on a further electronic device, the transceiver 125 may enable a wired or wireless connection with the further electronic device directly or indirectly such as via a network so that the information may be exchanged.

As discussed above, the processor 105 may execute the program-development application 135, the build application 140, and the leak-detection application 145 for the selected application 150 to be tested for memory leaks. Again, the program-development application 135 shows the lines of programming code for the selected application 150. The build application 140 may compile the programming code into an executable application for execution of the selected application 150 by the processor 105. The leak-detection application 145 may determine the called memory API functions and freed/unfreed allocated chunks in the memory 112 to subsequently generate a graphical representation.

An application may include a plurality of commands, functionalities, options, etc. based upon entered lines of programming code. The programming code may be compiled to generate an executable file. For example, a word processor may be an application that enables a text document to be created. A programmer may enter the lines of programming code that allows for the different functionalities to be performed after the executable file is launched and being executed by the processor 105. As the complexity of the application increases such as enabling further options, a size of the programming code also increases. For example, programming code may include millions of lines of code. As functionalities are performed by the application, the application may request a chunk of the memory 112 for use by the application. Accordingly, this chunk of the memory 112 may be used for immediate data retrieval such as storing variables declared by the functionalities of the program. This request may be defined by a call to the memory API function in the programming code. In view of the limited size of the memory 112, the called memory API function has an opposite procedure to release or free the allocated chunk of memory 112 when its use is completed.

The program-development application 135 may allow a user or programmer to enter the plurality of lines of programming code for the selected application 150. The program-development application 135 therefore provides a user interface shown on the display device 115 for the programming code to be viewed. The program-development application 135 may also allow the user to review the programming code. The program-development application 135 may be configured with at least one programming language. Those skilled in the art will understand that there are many different types of programming languages and the exemplary embodiments may be configured for use with any of these programming languages such as C or C++.

Once the programming code is completed, the build application 140 may compile the programming code such that the selected application 150 may be executed for use by the processor 105. That is, the programming code is compiled into an executable file so that the user may begin to use the selected application 150. However, in view of the selected application 150 being executed for testing purposes to determine the existence of any memory leaks, the selected application 150 may be executed in a specialized manner rather than in a standard way such as with the program-development application 135, the build application 140, and the leak-detection application 145 being executed by the processor 105. The specialized manner may enable any potential memory leaks to be resolved without requiring any special operation to be performed. As described above, the exemplary embodiments may also include the functionalities of the program-development application 135 and the build application 140 to be performed on a further electronic device. Accordingly, no specialized execution operation may be used so long as the information may be provided to the leak-detection application 145.

Those skilled in the art will understand that despite the best efforts and intentions, the programming code may still include an error that results in an adverse effect such as a memory leak. As discussed above, the memory leak may relate to when an allocated chunk of the memory 112 is not freed even after its use by the selected application 150 is completed. That is, the memory API function in the programming code that is called to request the chunk of the memory 112 may operate properly so that the chunk is allocated but the opposing memory API function to release or free this chunk of the memory 112 may not be operating properly although written in an acceptable format within the programming code. Therefore, this unfreed, allocated chunk of the memory 112 is reserved by the selected application 150 but is not being used nor allowed to be used by other applications.

Although the memory 112 may be reset so that any allocated chunk of the memory 112 is available for use, any subsequent execution of the selected application 150 with its current programming code may result in the memory leak situation being repeated. That is, this reset may only provide an immediate but temporary solution to the memory leak issue. A more permanent solution entails identifying the portion of the programming code that causes the memory leak and fixing the fundamental aspect of incorrect or missing calls to the memory API function for releasing the allocated chunks of memory. Thus, any subsequent execution of the updated compiling of the programming code does not result in the memory leak issue.

According to the exemplary embodiments, a mechanism is provided to more efficiently identify memory leaks. Initially, the knowledge of an existence of a memory leak may not be as immediately apparent even to one skilled in the art. For example, if the memory 112 is sufficiently large, for the memory leak to become an issue where the processor 105 is affected may not occur until a substantial period of time has passed which may evade any notice by the user. When a memory leak is ultimately determined to exist, the programming code fix to be used may be a tedious task as each line of the programming code needs to be reviewed. The mechanism according to the exemplary embodiments is configured to identify potential candidates of memory API functions that result in the memory leak. As will be described in further detail below, the exemplary embodiments are configured to display unfreed, allocated chunks of the memory 112 sorted by time of allocation and allow for displaying a call tree for the unfreed, allocated chunks of the memory 112 originated in a selected period of time.

The leak-detection application 145 may perform the functionalities that provide the above described features. Specifically, the leak-detection application 145 may monitor the execution of the selected application 150 by the build application 140. The leak-detection application 145 may monitor the selected application 150 and the memory API functions being performed for a period of time. The period of time may be a predetermined amount of time, a user selected amount of time, an entire duration that the selected application is being used, etc. During this period of time, the memory API functions may be monitored based upon when they are performed so that the time when the chunk of the memory 112 is allocated may also be recorded. The leak-detection application 145 may subsequently determine which of the allocated chunks of the memory 112 during this time period have been released. Accordingly, the leak-detection application 145 may indicate which of the allocated chunks remain allocated for the selected application. The leak-detection application 145 according to the exemplary embodiments may further be configured to generate a graphical representation of the information that was recorded. Specifically, the graphical representation may indicate when a chunk of the memory 112 has been allocated to the selected application 150 based upon when the allocation was performed.

Furthermore, the graphical representation may be filtered such that only the chunks of the memory 112 that have not been released are shown in the graphical representation. In addition, the monitoring feature may record a size or other parameter of the chunk of the memory 112 being allocated. In this manner, an exemplary embodiment of the graphical representation may be illustrated using a bar graph with the x-axis representing time and the y-axis representing a size of the unfreed allocation.

It should be noted that the above described functionalities performed by the leak-detection application 145 is only exemplary. According to another exemplary embodiment, the above described functionalities of the leak-detection application 145 may also be performed on the further electronic device. Specifically, the monitoring and recording of the information may be performed on the further electronic device. Subsequently, the information may be transmitted to the electronic device 100 via the transceiver 125 such that the leak-detection application 145 receives the information.

Figure 2:
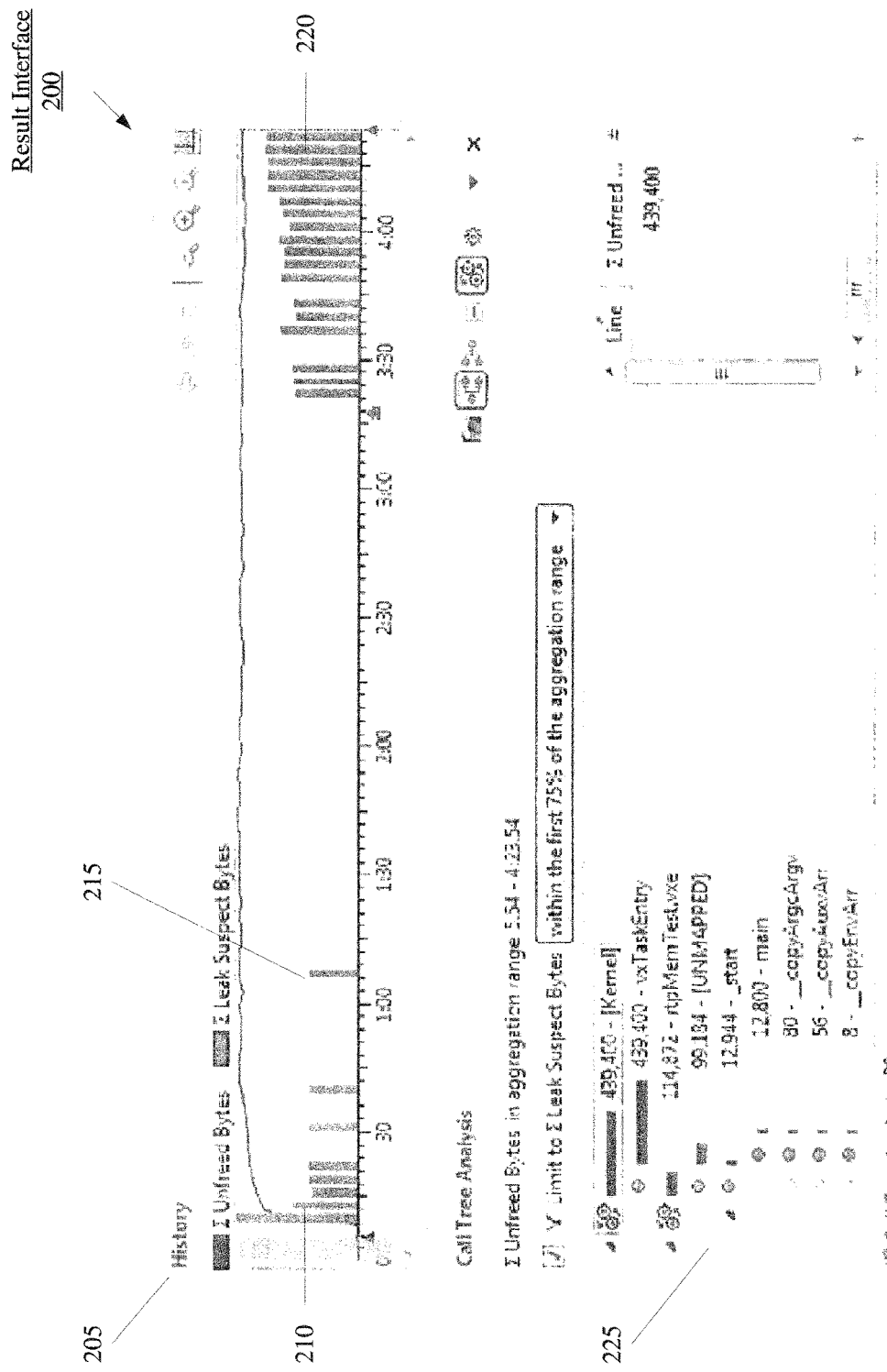
FIG. 2 shows a first result interface according to the exemplary embodiments.

FIG. 2 shows a result interface 200 according to the exemplary embodiments. The result interface 200 may illustrate an exemplary execution of the selected application 150 in which there is a high probability that there is no memory leak. The result interface 200 may be generated by the leak-detection application 145 based upon the information gathered while monitoring the execution of the selected application 150. The result interface 200 may include a graphical representation 205 and a call tree 225.

The graphical representation 205 may illustrate the unfreed, allocated chunks of the memory 112 as a function of time during the time period in which the selected application 150 was being executed. As the selected application 150 is in use, the different functionalities may be used which may require the use of the memory chunks to be allocated to the selected application. The graphical representation 205 may enable a user viewing it to readily determine whether a memory leak may exist. Specifically, addresses and call stacks related to the unfreed chunks of the memory 112 are collected by the leak-detection application 145 and visualized in the graphical representation 205.

Initially, unfreed allocations that are near the start and end of the time period are unlikely to be an issue or present a cause related to a memory leak. An unfreed allocation near the start of the time period or during an initiation of the selected application 150 simply relates to allocating chunks of memory that are needed by the selected application 150 for the duration of the selected application 150 and not as a temporary memory requirement that can or needs to be released. An unfreed allocation near the end of the time period or during a termination of use of the selected application may simply be freed very soon. That is, the time period may have been cut prematurely prior to the unfreed allocations near the end to be allowed to be released.

The leak-detection application 145 may be configured to provide the graphical representation 205. Specifically, a user viewing the graphical representation 205 may easily distinguish and omit unfreed allocations near the start and end of the time period. In the graphical representation 205, there may include a plurality of unfreed allocations 210 near the start of the time period, a plurality of unfreed allocations 220 near the end of the time period, and at least one unfreed allocation 215 between these time sections. The start time section and the end time section may be determined based upon a variety of different criteria. For example, the duration of the time sections may be a percentage based on the entire time period, may be selected by the user, etc. Accordingly, the analysis to determine whether an unfreed allocation corresponds to a memory leak may omit the unfreed allocations 210 and 220.

The leak-detection application 145 may further generate a call tree 225. The call tree 225 may show all functionalities performed by the selected application 150 and memory allocation statistics gathered throughout the time period in which the selected application 150 is executed. Furthermore, the call tree 225 may be filtered so that only the allocated chunks of the memory 112 that are unfreed and not in the start or end time sections are included. As shown in the call tree 225, the name of the performed functionality and/or a description may be provided with the corresponding total allocated chunk of the memory 112. Using the graphical representation 205 and the call tree 225, the user may determine whether a memory leak exists from executing the selected application 150. In this instance, although there may be a suspect allocated chunk 215 of the memory 212, the user may ultimately determine that there is no memory leak based upon the remaining available information.

Figure 3:
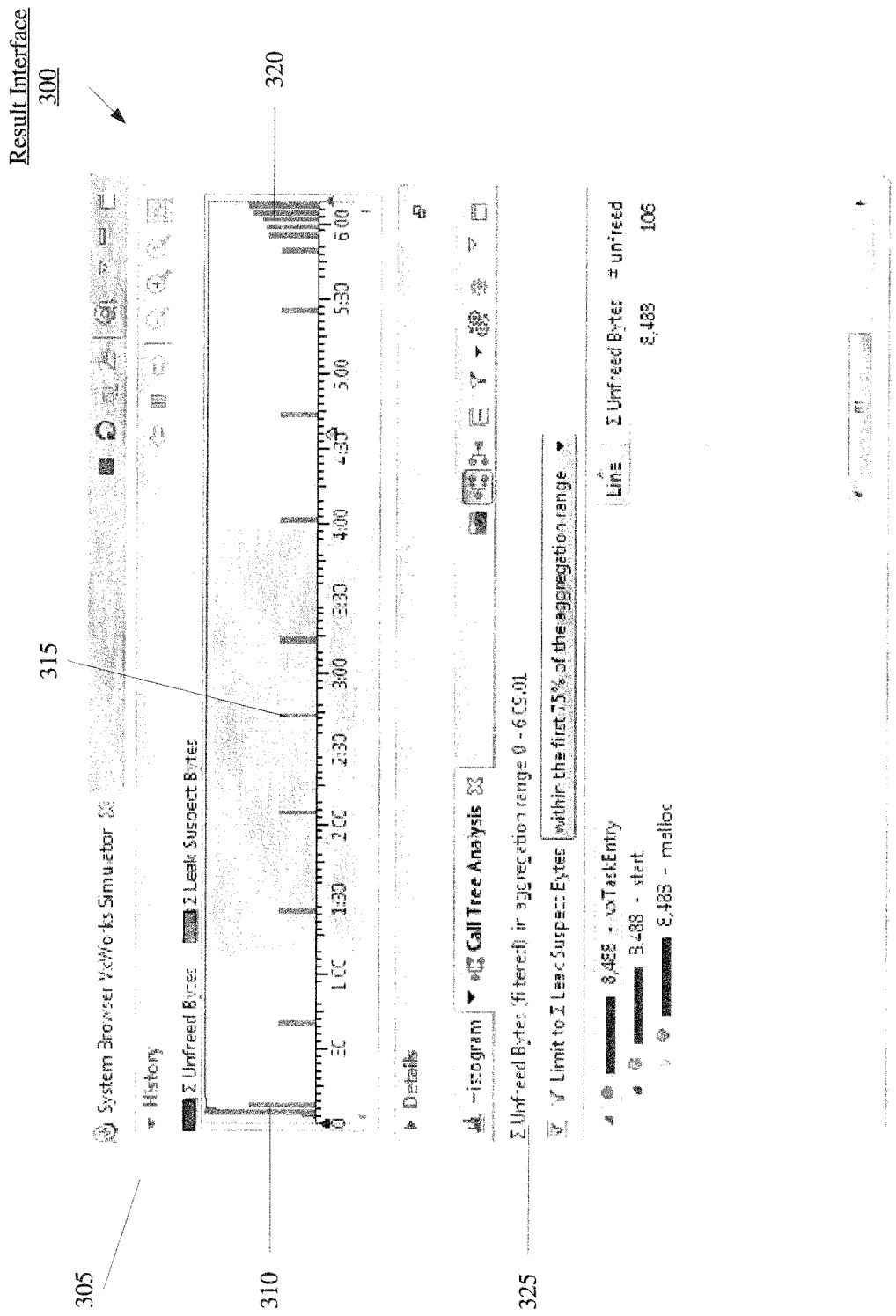
FIG. 3 shows a second result interface according to the exemplary embodiments.

FIG. 3 shows a result interface 300 according to the exemplary embodiments. The result interface 300 may illustrate an exemplary execution of the selected application 150 in which there is a high probability that there is a memory leak. Again, the result interface 300 may be generated by the leak-detection application 145 based upon the information gathered while monitoring the execution of the selected application 150. The result interface 300 may also include a graphical representation 305 and a call tree 325.

The graphical representation 305 may also include at least one unfreed allocation 310 at a start of the time period and at least one unfreed allocation 320 at an end of the time period. As discussed above, these unfreed allocations 310, 320 may be omitted from consideration as to a cause of any memory leak. However, in contrast to the graphical representation 205 of FIG. 2, there may be a plurality of unfreed allocations 315 between the start and end time sections. In fact, it is also evident based upon the graphical representation 305 alone that the unfreed allocations 315 may have substantially the same chunk size. Accordingly, the user may determine that the selected application 150 may indeed have a memory leak based upon the graphical representation 305. That is, one skilled in the art will understand that when the selected application 150 has no unfreed allocations created over a longer period within the time period, there is no memory leak as is the case and shown in the graphical representation 205. In contrast, one skilled in the art will also understand that when the selected application 150 has unfreed allocations appearing periodically over time, there is a memory leak as is the case and shown in the graphical representation 305.

The call tree 325 may also include only the unfreed allocations 315 that are not within the start and end time sections (i.e., allocations 310, 320). The call tree 325 may therefore list the name or description of the memory API functionality that results in the unfreed allocations 315 as well as the total allocated chunk of the memory 112. Again, through use of the graphical representation 305 and the call tree 325, the user may be capable of narrowing down any search for the manual inspection to address the memory leak in the programming code. Specifically, the user may navigate to the source code for the corresponding memory API function in the call tree 325 in the programming code to determine whether the allocation is actually a memory leak.

It should be noted that the leak-detection application 145 may include further functionalities that may provide additional features that may streamline the manual inspection of the programming code to address a memory leak. That is, the leak-detection application 145 may be configured with additional automated features. In a first automated feature, the leak-detection application 145 may automatically determine whether the selected application 150 has a memory leak. The leak-detection application 145 may perform analyses on the graphical representation and/or the information that is provided to determine the existence of a memory leak. When this determination is made, the leak-detection application

145 may provide an indication to the user of the determined memory leak. In a second automated feature, the leak-detection application 145 may automatically provide a navigation feature to suspected memory API functions that potentially cause the memory leak in the programming code corresponding to the identified functionality in the call tree. The navigation feature may allow the user to inspect a first suspect, enter an input to move onto a next suspect, inspect a second suspect, etc. Accordingly, the manual inspection of the programming code may be a streamlined process performed in an efficient manner. In a third automated feature, the leak-detection application 145 may review the suspect memory API functions and provide possible changes to the programming code for the user's review. Thus, the manual inspection process may be further streamlined.

Figure 4:
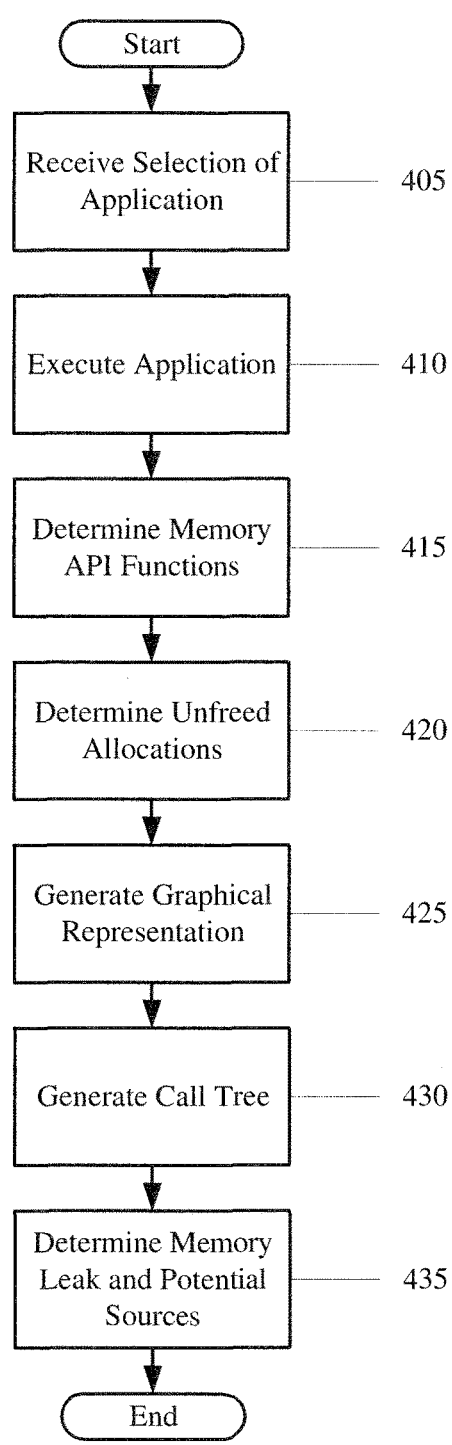
FIG. 4 shows a method for graphically representing memory leaks according to the exemplary embodiments.

FIG. 4 shows a method 400 for graphically representing memory leaks according to the exemplary embodiments. Specifically, the method 400 relates to testing the selected application 150 for the existence of memory leaks. The method 400 will be described with regard to the electronic device 100 of FIG. 1 and the functionalities of the different applications being executed by the processor 105. The method 400 will also be described with regard to the electronic device 100 performing the different functionalities. However, as discussed above, this is only exemplary and select ones of the functionalities may be performed by a further electronic device that transmits information resulting therefrom to the electronic device 100.

In step 405, the electronic device 100 may receive a selection of an application to be tested. As discussed above, the program-development application 135 may receive inputs from a user to generate the lines of the programming code for the selected application 150 to be tested. In another exemplary embodiment, the programming code of the selected application 150 to be tested may be received via the transceiver 125 and/or the I/O device 120 such as a storage media reading component. Subsequently, in step 410, the selected application 150 may be executed and run for a period of time via the build application 140. As discussed above, when performed on the electronic device 100 that also analyzes whether the selected application 150 includes a memory leak, a specialized execution may be performed by the build application 140.

It should be noted that steps 405 and 410 may be performed at different times and on a further electronic device. For example, by using a further electronic device, a specialized execution of the selected application 150 may not be required. However, the recording of the information from the execution of the selected application 150 is required to be maintained. In another example, when the programming code has already been created and the electronic device 100 is only used for the analysis for memory leaks, the programming code may be provided after the analysis is completed and the manual inspection is to be performed.

However, since the method 400 is described with reference to the electronic device 100 performing the functionalities of the program-development application 135, the build application 140, and the leak-detection application 145, in step 415, the electronic device 100 via the leak-detection application 145 determines the memory API functions that are performed during the time period that the selected application 150 is executed. In step 420, the electronic device 100 via the leak-detection application 145 also determines the unfreed allocations for the memory API functions.

With this information, in step 425, the leak-detection application 145 generates a graphical representation for the memory API functions in which the allocated chunks of the memory 112 are unfreed or have not been released. For example, when a memory leak has a high probability of not being present, the graphical representation 205 may be generated whereas when a memory leak has a high probability of being present, the graphical representation 305 may be generated.

In step 430, the leak-detection application 145 further generates a call tree for the memory API functions having the allocated chunks of the memory 112 that are unfreed. The call tree may include information of the memory API functions such as the name or description and the corresponding size of the allocated chunk or total size. As discussed above, the method 400 may include a further step in which the memory API functions are filtered prior to generating the call tree. Specifically, the memory API functions having unfreed allocations may be omitted from the call tree if present within either a starting time section or an ending time section as these memory API functions are likely to be unrelated to causing a memory leak.

The user may utilize the information provided by the graphical representation and the call tree to determine whether a memory leak exists and if so, to filter the memory API functions to be reviewed in the manual inspection to fix the cause of the memory leak. For example, a periodic unfreed allocation not within the starting or ending time sections illustrated in the graphical representation may be indicative of a memory leak. The identification of the memory API function associated with this unfreed allocation in the call tree may provide information to narrow a search field of the memory API functions in the programming code to be reviewed in the manual inspection.

However, as discussed above, the exemplary embodiments may further provide an automated mechanism for identifying and even suggesting potential fixes to possible memory API functions causing the memory leak. Thus, in step 435, the leak-detection application 145 analyzes the information gathered from executing the selected application 150 as well as utilizing the information of the graphical representation and the call tree to provide suspected memory leaks. The leak-detection application 145 may further be configured to review the suspected memory API functions in the programming code and provide corresponding ways to fix the memory leak. In a specific feature, the leak-detection application 145 may highlight the portions of the programming code to be reviewed.

The exemplary embodiments describe a device and method for determining memory leaks from executing an application having programming code. Specifically, the exemplary embodiments utilize information corresponding to memory API functions of the selected application, the time in which they are performed, and whether the allocated chunk of memory is freed to generate a graphical representation with a corresponding call tree for those satisfying the above further criteria. Accordingly, a user viewing the graphical representation and the call tree may readily identify suspect memory leak candidates and filter a search field of the programming code to memory API functions indicated in the call tree.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform, MAC OS, iOS, Android OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
executing a selected application for a time period;
determining a plurality of memory application programming interface (API) functions performed during the execution of the selected application in the time period, each of the memory API functions requesting a chunk of a memory of the electronic device at a specified time;
determining select ones of the memory API functions that do not release the respective chunk of the memory in the time period;
determining a respective size of each chunk of the memory requested and not released by each of the memory API functions; and
generating a graphical representation including the selected memory API functions at the respective specified time for identification of a memory leak of the selected application,
wherein the respective size of each chunk of the memory is included in the graphical representation.

2. The method of claim 1, further comprising:
generating a call tree for each of the selected memory API functions.

3. The method of claim 2, wherein the call tree includes at least one of a name, a description, and a size for each of the selected memory API functions.

4. The method of claim 2, wherein the selected memory API functions are filtering to omit first ones of the selected memory API functions at a starting time section of the time period and second ones of the selected memory API functions at an ending time section of time period.

5. The method of claim 1, further comprising:
determining whether the graphical representation includes at least one suspect memory leak.

6. The method of claim 5, wherein the at least one suspect memory leak corresponds to one of the select memory API functions being included in the graphical representation periodically along the time period.

7. The method of claim 5, further comprising:
indicating a source in a programming code of the selected application corresponding to the at least one suspect memory leak.

8. The method of claim 1, wherein the graphical representation is a bar graph.

9. A device, comprising:
a storage arrangement including a memory in which portions thereof is allocated for use by at least one application; and
a processor configured to identify a memory leak, the processor configured to execute a selected application for a time period, the processor configured to determine a plurality of memory application programming interface (API) functions performed during the execution of the selected application in the time period, each of the memory API functions requesting a chunk of the memory at a specified time, the processor configured to determine select ones of the memory API functions that do not release the respective chunk of the memory in the time period, the processor configured to determine a respective size of each chunk of the memory requested and not released by each of the memory API functions, the processor configured to generate a graphical representation including the selected memory API functions at the respective specified time for identification of a memory leak of the selected application, wherein the respective size of each chunk of the memory is included in the graphical representation.

10. The device of claim 9, wherein the processor is further configured to generate a call tree for each of the selected memory API functions.

11. The device of claim 10, wherein the call tree includes at least one of a name, a description, and a size for each of the selected memory API functions.

12. The device of claim 10, wherein the selected memory API functions are filtering to omit first ones of the selected memory API functions at a starting time section of the time period and second ones of the selected memory API functions at an ending time section of time period.

13. The device of claim 9, wherein the processor is further configured to determine whether the graphical representation includes at least one suspect memory leak.

14. The device of claim 13, wherein the at least one suspect memory leak corresponds to one of the select memory API functions being included in the graphical representation periodically along the time period.

15. The device of claim 13, wherein the processor is further configured to indicate a source in a programming code of the selected application corresponding to the at least one suspect memory leak.

16. A non-transitory computer readable storage medium with an executable program stored thereon, wherein the program instructs a microprocessor to perform operations comprising:
executing a selected application for a time period;
determining a plurality of memory application programming interface (API) functions performed during the execution of the selected application in the time period, each of the memory API functions requesting a chunk of a memory of an electronic device at a specified time;
determining select ones of the memory API functions that do not release the respective chunk of the memory in the time period;
determining a respective size of each chunk of the memory requested and not released by each of the memory API functions; and
generating a graphical representation including the selected memory API functions at the respective specified time for identification of a memory leak of the selected application,
wherein the respective size of each chunk of the memory is included in the graphical representation.

* * * * *